US009756658B2

(12) United States Patent
Desai et al.

(10) Patent No.: US 9,756,658 B2
(45) Date of Patent: Sep. 5, 2017

(54) SYSTEM AND METHOD FOR CONTENTION-FREE RANDOM ACCESS (71) Applicant: FutureWei Technologies, Inc., Plano, TX (US)

(72) Inventors: Vipul Desai, Palatine, IL (US); Philippe Satori, Algonquin, IL (US); Brian Classon, Palantine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 476 days.

(21) Appl. No.: 13/926,904

(22) Filed: Jun. 25, 2013

(65) Prior Publication Data
US 2013/0343307 A1 Dec. 26, 2013

Related U.S. Application Data (60) Provisional application No. 61/664,574, filed on Jun. 26, 2012.

(51) Int. Cl.
*H04W 4/00* (2009.01)
*H04J 11/00* (2006.01)
(Continued)

(52) U.S. Cl.
CPC ........... *H04W 74/04* (2013.01); *H04W 74/08* (2013.01); *H04W 74/006* (2013.01)

(58) Field of Classification Search
CPC ... H04W 24/02; H04W 72/042; H04W 72/04; H04W 8/005; H04W 8/00; H04W 52/146;
(Continued)

(56) References Cited

U.S. PATENT DOCUMENTS 5,208,804 A 5/1993 Wilson et al.
8,243,657 B2 * 8/2012 Park ...................... H04L 1/1812
370/328

(Continued)

FOREIGN PATENT DOCUMENTS

CN 1497882 A 5/2004
CN 101175309 A 5/2008
CN 102083229 A 6/2011

OTHER PUBLICATIONS

3GPP_TSG_RAN_WG1 Archives Posting, Subject: Re: Rel-11 36.212 Specification, downloaded from http:/list.etsi.org/scripts/wa.exe?A2=ind1206D&L=3GPP_TSG_RAN, date of post Jun. 25, 2012, 2 pgs.
3GPP_TSG_RAN_WG1 Archives Posting, Subject: Rel-11 36.212 Specification, downloaded from http:/list.etsi.org/scripts/wa.exe?A2=ind1206D&L=3GPP_TSG_RAN, date of post Jun. 22, 2012, 2 pgs.

(Continued)

*Primary Examiner* — Hanh N Nguyen
(74) *Attorney, Agent, or Firm* — Slater Matsil, LLP (57) ABSTRACT

A method for initiating a random access includes generating a first downlink control information (DCI) including random access parameters and selecting a control channel from a first downlink control channel in common search space of a first subframe and a second downlink control channel in a data region of the first subframe. The method also includes mapping the first DCI to the control channel and transmitting, by a communications controller to a UE, symbols of the first subframe including the first DCI in the control channel. Additionally, the method includes receiving, by the communications controller from the UE, a random access waveform in accordance with the random access parameters and transmitting, by the communications controller to the UE, after receiving the random access waveform, a second subframe including a second DCI in a control channel of the second subframe, where the second DCI includes scheduling information for a random access response.

22 Claims, 5 Drawing Sheets (51) Int. Cl.
  *H04W 74/04* (2009.01)
  *H04W 74/08* (2009.01)
  *H04W 74/00* (2009.01)

(58) Field of Classification Search
  CPC ... H04W 24/00; H04W 4/00; H04W 74/0833;
      H04W 74/006; H04W 74/04; H04L 5/14;
      H04L 1/0029
  USPC .............. 370/328, 331, 337, 338, 335, 468,
      370/470–472, 203–210, 329, 330
  See application file for complete search history.

(56) References Cited

U.S. PATENT DOCUMENTS

| | | | | |
|---|---|---|---|---|
| 8,340,069 | B2* | 12/2012 | Qu | H04L 5/001 370/343 |
| 8,401,542 | B2* | 3/2013 | Chung | H04L 5/0007 370/485 |
| 8,493,917 | B2* | 7/2013 | Meyer | H04W 74/006 370/328 |
| 8,737,251 | B2* | 5/2014 | Baker | H04W 72/042 370/252 |
| 8,902,830 | B2* | 12/2014 | Nimbalker | H04W 52/0206 370/329 |
| 9,386,601 | B2* | 7/2016 | Dalsgaard | H04L 5/0098 |
| 2012/0188961 | A1* | 7/2012 | Suzuki | H04W 74/0833 370/329 |
| 2012/0307777 | A1 | 12/2012 | Pan et al. | |
| 2013/0194956 | A1* | 8/2013 | Sartori et al. | 370/252 |
| 2013/0201932 | A1* | 8/2013 | Ko | H04L 1/0061 370/329 |
| 2013/0242904 | A1* | 9/2013 | Sartori et al. | 370/329 |
| 2013/0315159 | A1* | 11/2013 | Xia et al. | 370/329 |
| 2014/0086195 | A1* | 3/2014 | Jung | H04W 52/367 370/329 |

OTHER PUBLICATIONS

3GPP_TSG_RAN_WG1 Archives Posting, Subject: Re: Draft CR to 36.211—inclusion of Rel-11 features, downloaded from http:/list.etsi.org/scripts/wa.exe?A2=ind1206D&L=3GPP_TSG_RAN, date of post Jun. 25, 2012, 10 pgs.

3GPP_TSG_RAN_WG1 Archives Posting, Subject: Draft Rel-11 CR to 36.213, downloaded from http:/list.etsi.org/scripts/wa.exe?A2=ind1206D&L=3GPP_TSG_RAN, date of post Jun. 24, 2012, 2 pgs.

3GPP TSG RAN WG1 Meeting #70, Draft Change Request, 36.212 CR, Current Version 10.6.0, "Introduction of Rel-11 LTE-Advanced feature in 36.212," QingDao, China, Aug. 13-17, 2012, 77 pgs.

Draft Change Request, 36.213 CR, Current Version 10.5.0, "Introduction of Rel-11 LTE-Advanced feature in 36.213," Jun. 24, 2012, 122 pgs.

"3GPP TS 36.216" V10.0.0 (Sep. 2010); 3rd Generation Partnership Project; Technical Specification Group Radio Access Network; Evolved Universal Terrestrial Radio Access (E-UTRA); Physical layer for relaying operation (Release 10), LTE 3GPP, Sep. 2010, 12 pages.

"ETSI TS 136 213" V8.8.0 (Oct. 2009), LTE; Evolved Universal Terrestrial Radio Access (E-UTRA); Physical layer procedures (3GPP TS 36.213 version 8.8.0 Release 8), Oct. 2009, 79 pages.

"3GPP TS 36.211" V8.7.0 (May 2009), 3rd Generation Partnership Project; Technical Specification Group Radio Access Network; Evolved Universal Terrestrial Radio Access (E-UTRA); Physical Channels and Modulation (Release 8); May 2009, 83 pages.

"3rd Generation Partnership Project; Technical Specification Group Radio Access Network; Evolved Universal Terrestrial Radio Access (E-UTRA); Multiplexing and channel coding (Release 10)," 3GPP TS 36.212 V10.6.0, Technical Specification, Jun. 2012, 79 pgs.

PCT International Search Report and Written Opinion for PCT/CN2013/077990, Applicant: Huawei Technologies Co., Ltd., mailed Oct. 17, 2013, 9 pages.

* cited by examiner

SYSTEM AND METHOD FOR CONTENTION-FREE RANDOM ACCESS

This application claims the benefit of U.S. Provisional Application Ser. No. 61/664,574 filed on Jun. 26, 2012, and entitled "System and Method for Contention-Free Random Access Using an Enhanced Control Channel," which application is hereby incorporated herein by reference.

TECHNICAL FIELD

The present invention relates to a system and method for wireless communications, and, in particular, to a system and method for contention-free random access.

BACKGROUND

In the Third Generation Partnership Project (3GPP) Long Term Evolution (LTE) Release-10 (Rel-10) technical standards, transmissions from a communications controller to user equipments (UEs) include both data channels and control channels. LTE is a standard for wireless communication for high speed data for mobile phones and data terminals. Compared to Global System for Mobile Communications (GSM) Enhanced Data Rates for GSM Evolution (EDGE) and Universal Mobile Telecommunications System (UMTS) High Speed Packet Access (HSPA) network technologies, LTE increases the capacity and speed of a network by using a different radio interface along with core network improvements.

In LTE Rel-10, the carrier bandwidth is one of six possible values (1.4 MHz, 3 MHz, 5 MHz, 10 MHz, 15 MHz, and 20 MHz). The frequency dimension contains subcarriers that may be 15 kHz apart. The time dimension of the system uses symbols, slots, subframes, and frames. In an example, the slots are 0.5 ms in duration. The subframes may contain two 0.5 ms duration slots, while the frames, which may be 10 ms in duration, contain ten subframes. The subframes are numbered from 0 to 9. There are seven symbols in a slot when a normal cyclic prefix (CP) is used. When an extended CP is used, there are six symbols per slot.

SUMMARY

An embodiment method for initiating a random access includes generating a first downlink control information (DCI) including random access parameters and selecting a control channel from a first downlink control channel in common search space of a first subframe and a second downlink control channel in a data region of the first subframe. The method also includes mapping the first DCI to the control channel and transmitting, by a communications controller to a UE, symbols of the first subframe including the first DCI in the control channel. Additionally, the method includes receiving, by the communications controller from the UE, a random access waveform in accordance with the random access parameters and transmitting, by the communications controller to the UE, after receiving the random access waveform, a second subframe including a second DCI in a control channel of the second subframe, where the second DCI includes scheduling information for a random access response.

Another embodiment method for initiating random access includes receiving, by a user equipment (UE) from a communications controller, symbols of a first subframe including a first downlink control information (DCI) and searching for the first DCI in a first downlink control channel in common search space of the first subframe and a second downlink control channel in UE specific search space in a data region of the first subframe. The method also includes obtaining random access parameters from the first DCI and transmitting, by the UE to the communications controller, a random access waveform in accordance with the random access parameters. Additionally, the method includes receiving a second DCI in a control region of a second subframe, where the second DCI includes scheduling information for a random access response.

An embodiment communications controller includes a processor and a computer readable storage medium storing programming for execution by the processor. The programming includes instructions to generate a first downlink control information (DCI) including random access parameters and select a control channel from a first downlink control channel in common search space of a first subframe and a second downlink control channel in a data region of the first subframe. The programming also includes instructions to map the first DCI to the control channel and transmit, to a UE, symbols of the first subframe including the first DCI in the control channel. Additionally, the programming includes instructions to receive, from the UE, a random access waveform in accordance with the random access parameters and transmit, to the UE, after receiving the random access waveform, a second subframe including a second DCI in a control channel of the second subframe, where the second DCI includes scheduling information for a random access response.

An embodiment user equipment (UE) includes a processor and a computer readable storage medium storing programming for execution by the processor. The programming includes instructions to receive, from a communications controller, symbols of a first subframe including a first downlink control information (DCI) and search for the first DCI in a first downlink control channel in common search space of the first subframe and a second downlink control channel in UE specific search space in a data region of the first subframe. The programming also includes instructions to obtain random access parameters from the first DCI and transmit, by the UE to the communications controller, a random access waveform in accordance with the random access parameters. Additionally, the programming includes instructions to receive a second DCI in a control region of a second subframe, where the second DCI includes scheduling information for a random access response.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
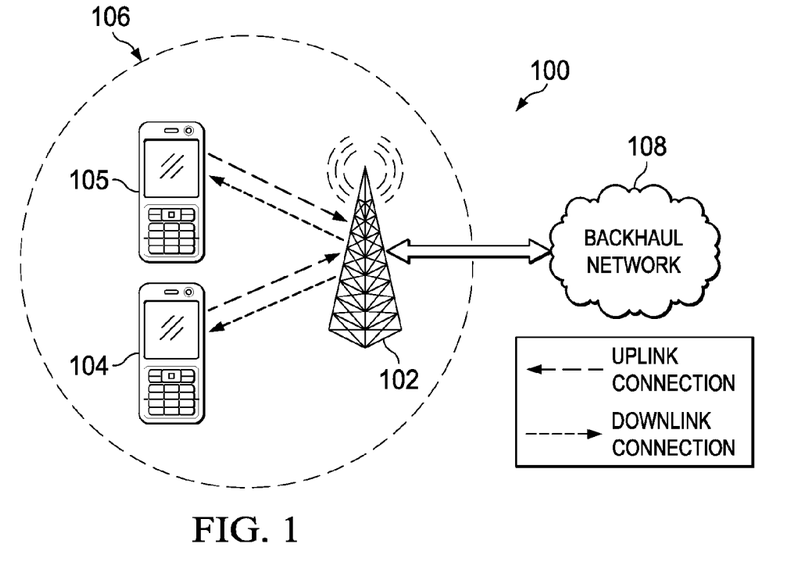
FIG. 1 illustrates a diagram of a wireless network for communicating data.

FIG. 1 illustrates network 100 for communicating data. Network 100 comprises communications controller 102 having a coverage area 106, a plurality of user equipments (UEs), including UE 104 and UE 105, and a backhaul network 108. Two UEs are pictured, but more may be present. Communications controller 102 may be any component capable of providing wireless access by, inter alia, establishing uplink (dashed line) and/or downlink (dotted line) connections with UE 104 and UE 105, such as a base station, an enhanced base station (eNB), a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end (not shown). In some embodiments, the network 100 may comprise various other wireless devices, such as relays, femtocells, etc.

Figure 2:
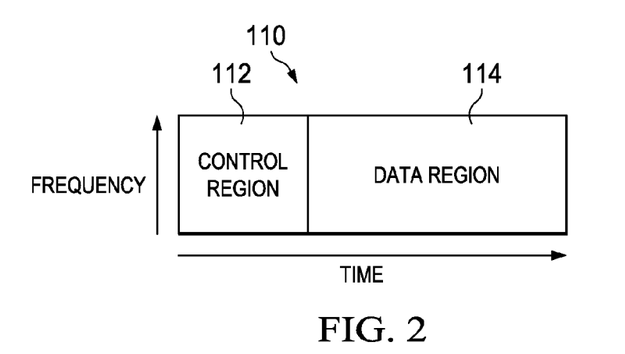
FIG. 2 illustrates a subframe structure.

In downlink transmissions, a subframe may be divided into a control region and a data region. FIG. 2 illustrates subframe 110 with control region 112 and data region 114. Control region 112 spans the entire frequency bandwidth of subframe 110. Control region 112 is located in the first several symbols of subframe 110, for example in the first four symbols. Control region 112 may include the physical downlink control channel (PDCCH), the physical control format indicator channel (PCFICH), the physical hybrid automatic request (HARQ) indicator channel (PHICH), as well as other signals, such as the common reference symbols. The PHICH is used to transmit an acknowledgement (ACK) or a negative acknowledgement (NACK) in response to uplink data transmissions. The PCFICH indicates the number of symbols of control region 112. Data region 114 may contain one or more physical downlink shared channel (PDSCH). Other channels of subframe 110 can be transmitted in data region 114, which may also be referred to as the data domain. The PDCCH conveys the downlink control information (DCI). The DCI provides scheduling information for downlink assignments on the PDSCH. Scheduling information may include resource assignments, such as which resource block pairs are used for a PDSCH. Additionally, the DCI may provide scheduling information for uplink grant for the physical uplink shared channel (PUSCH). Another purpose for the DCI is to convey power control commands, physical multicast channel (PMCH) commands, and random access channel (RACH) commands.

Control region 112 contains one or more control channel elements (CCEs), which comprise resource elements (REs). A mapping procedure assigns the REs to a time location and a frequency location within control region 112. A CCE may use non-contiguous resources to exploit frequency diversity. In an example, a control region assignment may have an aggregation level of one, two, four, or eight consecutive CCEs. A UE may use search space rules to identify possible CCEs that contain DCIs. The search space rules, which may have provisions for a common search space, provide an upper bound in complexity. The UE uses the search space rules to identify possible CCEs that contain resource assignments, for example, for a PDSCH. In a control region, there are a number of CCEs, denoted by $N_{CCE}$ per subframe. The CCEs are numbered from 0 to $N_{CCE}-1$. CCEs may be assigned to a common search space (CSS) or a UE specific search space (USS). The common search space includes CCEs 0 through 15, or 0 through $N_{CCE}-1$ if $N_{CCE}<16$. However, the UE specific search space includes CCEs 0 through $N_{CCE}-1$. Thus, there may be overlap between the common search space and the UE specific search space.

A UE may examine certain CCEs in the UE specific search space based on its radio network temporary identifier (RNTI) to locate a certain PDCCH. There are several RNTIs defined in a cellular system, such as the cell RNTI (C-RNTI), the random access RNTI (RA-RNTI), the paging RNTI (P-RNTI), and the system information RNTI (SI-RNTI). For example, an RA-RNTI can have a value between 1 and 0x3C, inclusive, the SI-RNTI is 0xFFFF, and the P-RNTI is 0xFFFE. The C-RNTI can be in the range of 0x3D to 0xFFF3. In an example transmission process, a DCI message is initially generated. This DCI message is then processed by a cyclic redundancy check (CRC) code to produce a parity sequence. The RNTI is added, using exclusive-or operations, to the parity sequence. Other terms for the addition of the RNTI are "the parity sequence is scrambled with the RNTI" and "the CRC scrambled by the RTNI." The concatenated DCI message and parity sequence is then convolutionally encoded. The convolutionally encoded sequence is interleaved, scrambled with another sequence, and converted into modulation symbols, such as a quadrature phase shift keying (QPSK) symbols. Then, the modulated symbols corresponding to the DCI are mapped to resource elements of the appropriate CCE(s) located in the control region of the subframe. The symbols of the subframe (for both the control region and data region) are then transmitted.

Figure 3:
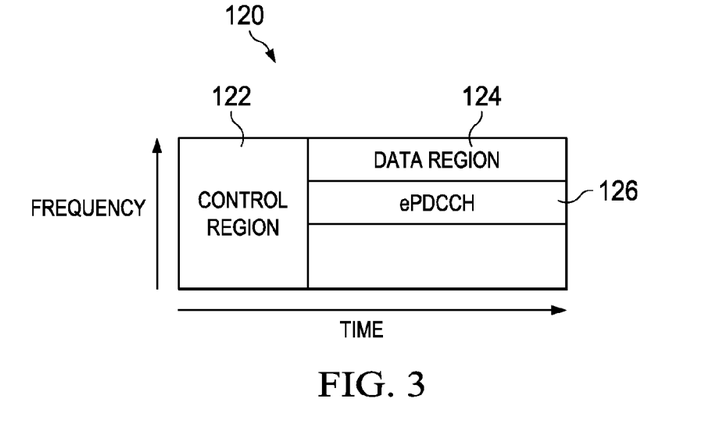
FIG. 3 illustrates another subframe structure.

An enhanced PDCCH (ePDCCH) may be used instead of a PDCCH. Unlike the PDCCH, the ePDCCH can be multiplexed with PDSCH in the data region. An ePDCCH may increase the control channel capacity. FIG. 3 illustrates subframe 120 with control region 122 and data region 124, which contains ePDCCH 126. In one example, ePDCCH 126 is frequency domain multiplexed (FDM). In another example, ePDCCH 126 can be time domain multiplexed (TDM) or code domain multiplexed (CDM) with other channels, such as data channels. Like the PDCCH, the ePDCCH conveys the DCI to provide scheduling information for both uplink grants and downlink assignments. However, unlike the PDCCH, the ePDCCH uses a UE specific demodulation reference signal (DMRS).

The ePDCCH may have search spaces, which may include a set of enhanced CCEs (eCCEs), and may be defined in terms of eCCEs or Resource Blocks (RBs). In an example, one RB pair contains four eCCEs. Unlike the PDCCH search space, the eCCEs or RBs not used for ePDCCH transmission may be used for other transmissions, such as for other ePDCCH, PDSCH, or other channels. Additionally, the size of eCCEs may vary on a subframe by subframe basis, depending on the amount of overhead, such as the number of symbols used for control region 122, the absence or presence of a common reference symbol (CRS), or the amount of channel state information reference signals (CSI-RS). The processing of the DCI for the ePDCCH is similar as the PDCCH. One difference is that, for the ePDCCH, the modulated symbols corresponding to the DCI are mapped to resource elements located in the data region of the subframe. These resource elements belong to the appropriate eCCE(s).

Like the PDCCH, the ePDCCH may have two types of search spaces, a UE specific search space, and a common search space. The UE specific ePDCCH search space is specific to one UE or a group of UEs. Additionally, the UE specific ePDCCH search space may be indicated to the UE by high layer signaling, such as radio resource control (RRC) signaling, or dynamic signaling such as PDCCH signaling or ePDCCH signaling. Alternatively, the UE specific ePDCCH search space may be based on a fixed location or a pre-defined calculation. All UEs may process the ePDCCH CSS, which may be used to transmit resource assignments or other signaling information. The search space of the control channels may contain a set of rules. For example, there is one set of rules for the common search space of the PDCCH, a second set of rules for the UE specific search space of the PDCCH, a third set of rules for the UE specific search space of the ePDCCH, and a fourth set of rules for the common search space of the ePDCCH. These rules indicate how modulated DCI messages are mapped in the data region (for the ePDCCH) and in the control region (for the PDCCH). There may a different set of rules or specifications (configurations) indicating whether the ePDCCH or PDCCH is used. The length of the DCI may be a function of the search space used (common or UE specific) and/or the type of control channel (PDCCH or ePDCCH). For example, for the PDCCH, a format 1A DCI transmitted in the common search space may be one or two bits shorter than a format 1A DCI transmitted in the UE specific search space.

Figure 4:
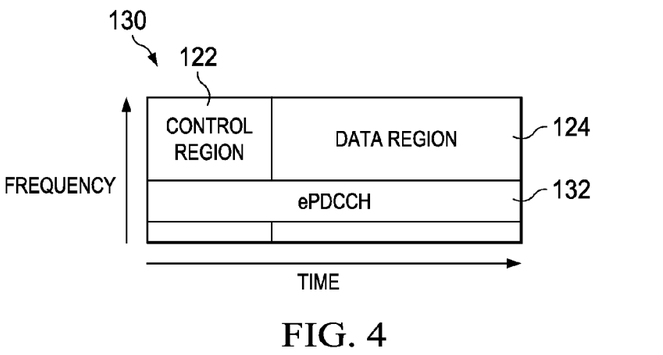
FIG. 4 illustrates an additional subframe structure.

FIG. 4 illustrates subframe 130, which contains control region 122 and data region 124. In subframe 130, ePDCCH 132 is transmitted in both control region 122 and data region 124.

Figure 5:
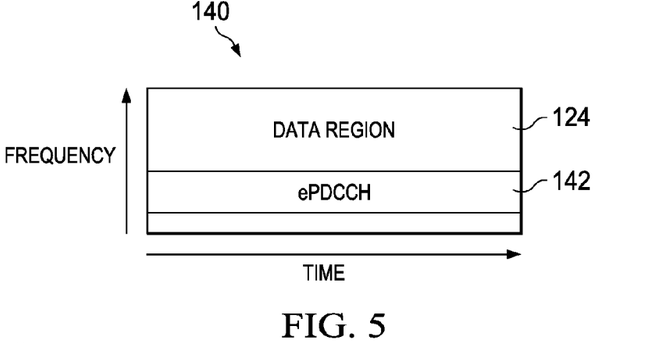
FIG. 5 illustrates another subframe structure.

FIG. 5 illustrates subframe 140 which contains data region 124, but does not contain a control region. Data region 124 contains ePDCCH 142. In one example, subframe 140 is used as a standalone carrier.

Figure 6:
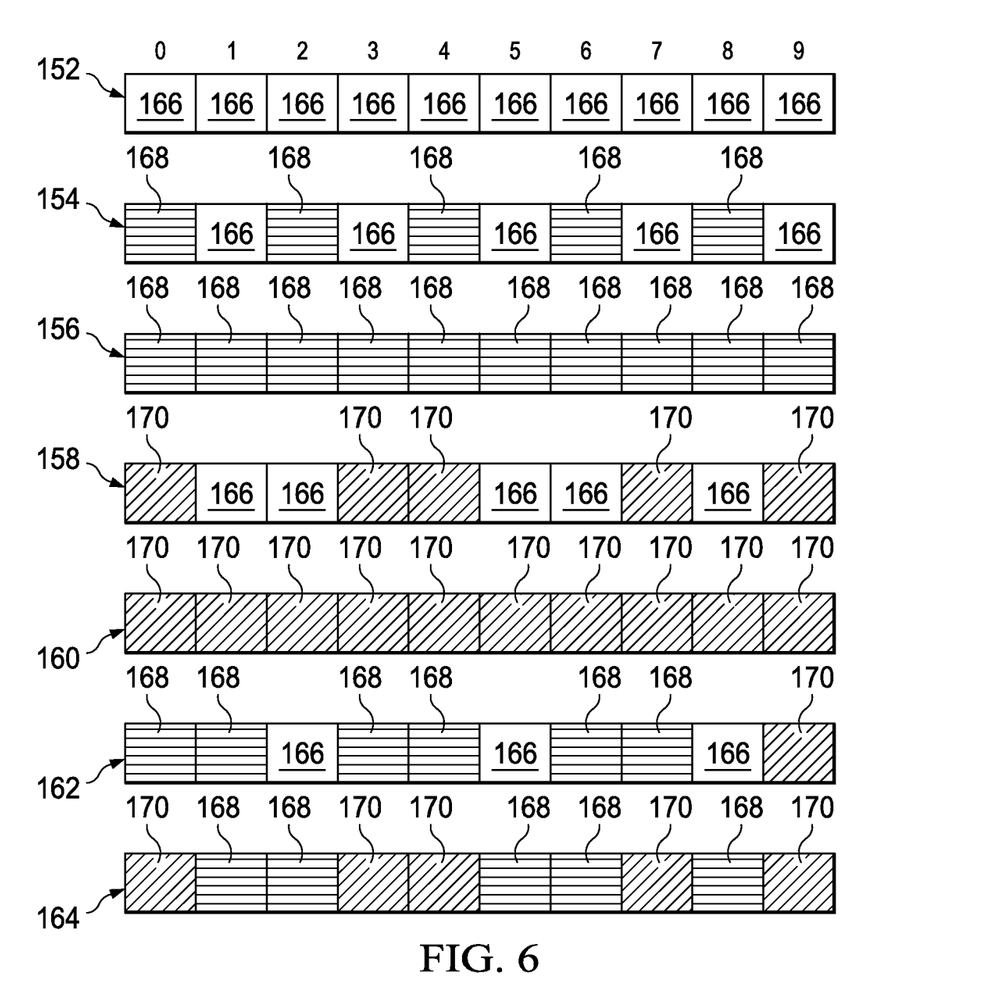
FIG. 6 illustrates the structure of subframes within frames.

FIG. 6 illustrates examples of combinations of subframes within frames. The pictured frames are for an FDD system. However, similar allocations of subframes occur for TDD systems. These configurations of the frame may be broadcast from communications controller 102 to UE 104, for example using RRC messaging. Different UEs may have different configurations. Frame 152 contains subframes 166 with PDCCH only (no ePDCCH). In frame 154, subframes 1, 3, 5, 7, and 9 contain subframes 166 with PDCCH only, while subframes 0, 2, 4, 6, and 8 contain subframes 168, which have both PDCCH and ePDCCH. Also, frame 156 contains only subframes 168 having PDCCH and ePDCCH. In frame 158, subframes 1, 2, 5, 6, and 8 contain subframes 166 with PDCCH only, while subframes 0, 3, 4, 7, and 9 contain subframes 170 with ePDCCH only (no PDCCH). Frame 160 contains only subframes 170 with ePDCCH only. For frame 162, subframes 2, 5, and 8 have PDCCH only, subframes 0, 1, 3, 4, 6, and 7 are subframes 168 with PDCCH and ePDCCH, and subframe 9 is subframe 170 with ePDCCH only. Also, in frame 164, subframes 1, 2, 5, 6, and 8 are subframes 166 with both PDCCH and ePDCCH, while subframes 0, 3, 4, 7, and 9 are subframes 170 with ePDCCH only. In general, a communications controller can examine the subframe number and the frame configuration for one or more UE to determine which subframe supports the PDCCH and/or the ePDCCH. For example, if one subframe can support both the PDCCH and ePDCCH for a particular UE, the communications controller can determine where to map a DCI, for example in either the PDCCH in the control region or the ePDCCH in the data region of a subframe. The determination can be based on factors such as the capacity of the search spaces, how many resources (e.g., CCEs or eCCEs) are available, and the type (format) of the DCI.

In UE operation, the UE examines the PDCCH transmitted in the common search space for DCIs whose CRCs were scrambled with the SI-RNTI, for example, during initial access (when the UE powers on) or after leaving discontinuous transmission (e.g., sleep). When the UE finds such a PDCCH, it may receive a PDSCH containing system broadcast parameters for random access. In the random access procedure used in LTE, a UE uses the RACH to transmit a random access waveform to the communications controller. The random access waveform may be referred to as a random access preamble. The random access waveform is generated on the parameters for the random access. The communications controller broadcasts a set of RACH parameters to the UEs using the RACH-ConfigCommon information element, as described in LTE specification 3GPP TS 36.331. The parameters include the prach-ConfigurationIndex, which indicates opportunities for the UE to transmit on the RACH. The prach-ConfigurationIndex indicates the periodicity within 20 ms, containing two 10 ms frames. Also, the prach-ConfigurationIndex indicates which 1 ms subframes within the frame are available for the UE to transmit the RACH. Although the RACH configuration in TDD is slightly different than in FDD, the FDD frame structure illustrated in FIG. 6 can be used to describe the RACH process in FDD. Other RACH parameters include the logical root sequence number which is used for generating the RACH waveform. Also, other parameters include values that determine the cyclic shift that may be used in the RACH waveform. In an example, there can be a maximum of 64 cyclic shifts.

The random access procedure may be contention based or contention-free access. In contention based RACH, several UEs compete for a set of transmission resources. From a communications controller perspective, the UEs appear randomly located in a serving area. On the other hand, in contention-free RACH a particular UE is targeted by a communications controller. RACH procedures may be initiated by a UE when the UE is turned on and searches for a communications controller. Alternatively, RACH procedures may be initiated by the communications controller during handoff from one cell to another, and an exact set of RACH parameters, such as cyclic shift, is used to reduce the likelihood of a collision between two or more RACH waveforms having the same cyclic shift value at a communications controller. The set of cyclic shifts may be divided into two subsets based on the RACH parameters. In contention based RACH, a UE randomly selects a cyclic shift from a first subset. On the other hand, in contention-free RACH, the communications controller transmits parameters for random access, such as a preamble index indicating to the UE a cyclic shift to use. The cyclic shift for contention-free RACH may correspond to a cyclic shift from a second subset. Also, in the contention-free mode, the communications controller transmits a physical RACH (PRACH) mask index indicating when the UE should transmit its RACH waveform.

Figure 7:
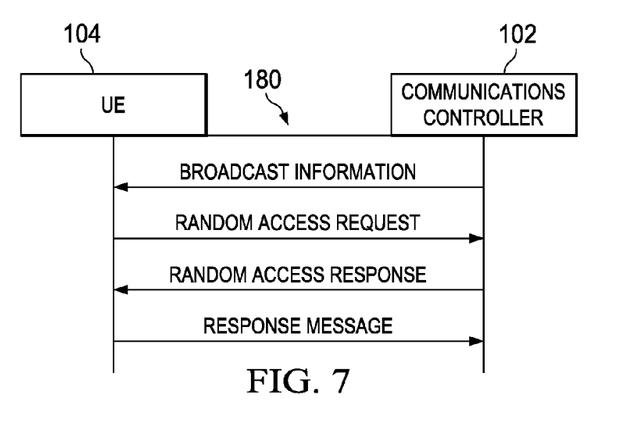
FIG. 7 illustrates an embodiment message sequence for contention based random access.

FIG. 7 illustrates message sequence 180 for contention-based RACH between communications controller 102 and UE 104. Initially, communications controller 102 broadcasts information, such as RACH parameters, which is received by UEs, including UE 104. The SI-RNTI is used in this broadcast. Also, the common search space in control region 112 of subframe 110 (i.e., the CSS of the PDCCH) is used to broadcast the DCI containing the scheduling information of the PDSCH carrying the RACH parameters.

UE 104 responds with a RACH waveform on the uplink. In an example configuration for RACH, the transmitted RACH waveform occupies six resource block pairs and the duration of the waveform is less than one subframe (1 ms). Other configurations may change the duration of the waveform. The waveform can be generated with Zadoff-Chu (ZC) sequences, where the RACH parameter and logical root sequence can be used to determine a particular ZC sequence. The cyclic shift is applied to the ZC sequence prior to the transmission of the waveform. In an example application, the communications controller processes the received waveform to determine the cyclic shift used in the waveform.

Then, communications controller 102 responds with a random access response (RAR). In an example, the scheduling information for the random access response is transmitted on a DCI format 1A in the PDCCH. This DCI has its CRC scrambled with the RA-RNTI. Also, the common search space is used for the RAR. The RAR may have one or more grants, corresponding to each RACH waveform detected by the communications controller. In addition, for each grant, there may be a suggested timing advance value (to ensure UE transmissions arrive at the communications controller within an appropriate time), and a power adjustment value (to ensure the power of the received UE transmission at the communications controller is acceptable).

UE 104 locates the DCI in the common search space and finds the grant in the corresponding PDSCH. Next, UE 104 transmits a response message on the PUSCH to communications controller 102. The message can include an RRC connection request, a tracking area update, or a scheduling request, as well as an identity (C-RNTI or 48-bit UE identity).

Figure 8:
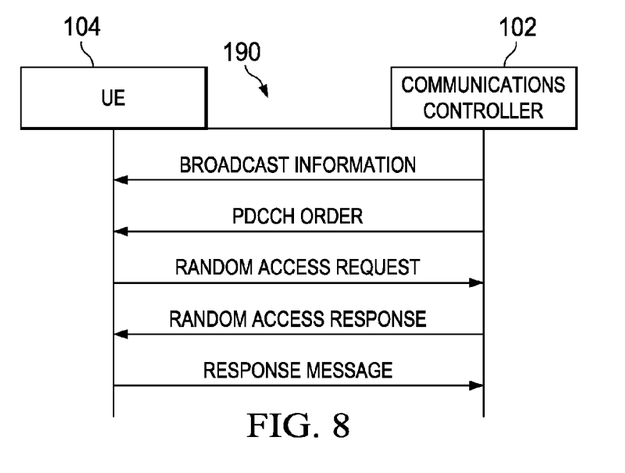
FIG. 8 illustrates an embodiment message sequence for contention-free random access.

FIG. 8 illustrates message sequence 190 for contention-free random access between communications controller 102 and UE 104. Initially, communications controller 102 broadcasts information, such as RACH parameters, which is received by UEs, including UE 104. The SI-RNTI is used to scramble the CRC of the DCI carrying the scheduling information of the PDSCH broadcasting the RACH parameters. Also, the common search space is used for this DCI.

Communications controller 102 then transmits a "PDCCH order" to a specific UE. In an example, the PDCCH order is transmitted on the ePDCCH. The PDCCH order may be transmitted in a DCI format 1A. C-RNTI is used to scramble the CRC of DCI format 1A (i.e., the PDCCH order). In one example, the PDCCH order is transmitted in the common search space. In another example, the PDCCH order is transmitted in UE specific search space. The communications controller may determine which search space (common or UE specific) and channel (PDCCH or ePDCCH) to transmit the PDCCH order on a subframe by subframe basis. In one example, the communications controller may decide to send the PDCCH order in the UE specific search space of the ePDCCH or the common search space of the PDCCH in a particular subframe.

UE 104 responds with a particular RACH waveform. The particular RACH waveform is transmitted on the uplink subframe. The subframe for transmitting the RACH waveform may be an offset, such as an offset of at least 6 subframes in the future from the subframe in which the PDCCH order was received. Before responding with the RACH waveform, the UE locates a DCI carrying the PDCCH order. The steps for locating a DCI include receiving transmitted symbols of the subframe, equalizing the resource elements to counteract the effects of channel impairments, generating log-likelihood ratios (LLRs) from the equalized resource elements, and descrambling and deinterleaving the LLRs to generate a sequence for a convolutional decoder (such as a Viterbi decoder) to produce a decoded sequence. Typically, a CRC is performed on the decoded sequence to produce a syndrome. If the syndrome matches an expected RNTI, the UE successfully received a DCI. In the process of generating LLRs, the UE locates the appropriate resource elements. For a system that does not support the ePDCCH, or if a UE is not capable of receiving the ePDCCH, the UE uses search space rules for the PDCCH to locate possible CCEs in both the UE specific search space and common search space within the control region. For a UE capable of receiving the ePDCCH, that UE knows which control channels (PDCCH and ePDCCH) can be used in a subframe based on its configuration. Also, the UE knows which search spaces can be used. In one example, for one subframe, the UE looks for potential DCIs among the eCCEs of the ePDCCH using UE specific search space rules and among CCEs of the PDCCH using common search space rules.

Next, communications controller 102 responds with a random access response (RAR) message, which is transmitted in a PDSCH. The scheduling information for the PDSCH carrying the RAR message may be indicated using a format 1A DCI whose CRC is, for example, scrambled with the RA-RNTI. The common search space may be used.

Then, UE 104 locates the PDCCH conveying this DCI for the RAR message in the common search space. The UE may expect this DCI to be transmitted by the communications controller within a window specified by higher layer messaging. The beginning subframe for the window is a function of when the RACH waveform was transmitted. The RAR message conveys one or more uplink grants based on the communications controller processing of RACH waveforms. A UE that has transmitted a RACH waveform, such as UE 104, attempts to locate a particular grant in the RAR. The UE transmits a response message on the PUSCH.

Figure 9:
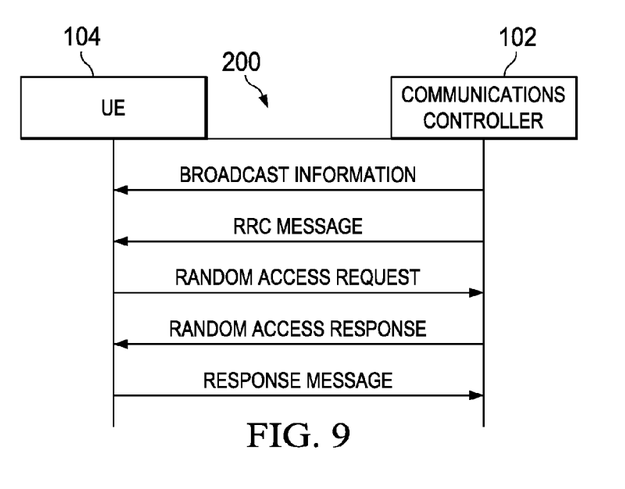
FIG. 9 illustrates another embodiment message sequence for contention-free random access.

FIG. 9 illustrates message sequence 200 for another contention-free random access method between communications controller 102 and UE 104. Initially, communications controller 102 broadcasts a message, such as RACH parameters. This message is received by UEs, including UE 104. The DCI for this message has its CRC scrambled by the SI-RNTI and is sent in the common search space.

Then, communications controller 102 transmits an RRC message over the PDSCH to a specific UE, such as UE 104, using a DCI whose CRC is scrambled by the C-RNTI. The common or UE-specific search space of the ePDCCH may be used.

In response, UE 104 transmits a RACH waveform to communications controller 102.

Then, communications controller 102 transmits a random access response to UE 104. In an example, the scheduling information for the random access response is transmitted in a format 1A DCI on the ePDCCH. The CRC of the DCI may be scrambled with the RA-RNTI. The common search space is used for this transmission.

UE 104 locates the DCI in the common search space, and finds the uplink grant in the corresponding PDSCH. Finally, UE 104 transmits a response message to communications controller 102 on the PUSCH.

Figure 10:
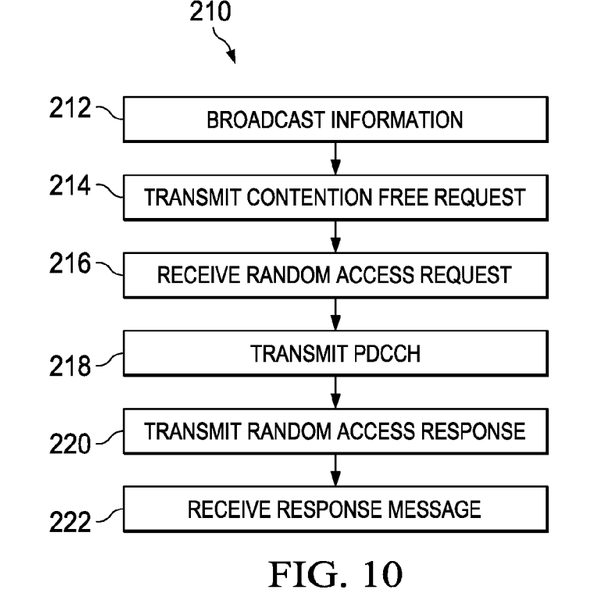
FIG. 10 illustrates an embodiment flowchart for a method of contention-free random access by a communications controller.

FIG. 10 illustrates flowchart 210 for a method of contention-free random access by a communications controller. Initially, in step 212, communications controller 102 broadcasts information to UEs, including UE 104. For example, communications controller 102 broadcasts RACH parameters.

Then, in step 214, communications controller 102 transmits a contention-free request to a particular UE, for example UE 104. In one example, the contention-free request is a PDCCH order, which may be transmitted using a format 1A DCI on the ePDCCH. The communications control may decide on which channel (PDCCH or ePDCCH) to place (map) the PDCCH order. In another example, the contention-free request is an RRC message, whose scheduling information may be transmitted on a format 1A DCI on the ePDCCH. The medium access control (MAC) can allow data and control messages, such as RRC messages, to be multiplexed and transmitted on the PDSCH. The DCI for the RRC message may not be restricted to format 1A, but other formats allowed by the transmission mode. When an RRC message is used, communications controller 102 may not know the contents of the RRC message. However, communications controller 102 may receive indications from other signaling mechanisms inside the cellular system of the RRC message.

Next, in step 216, communications controller 102 receives a RACH waveform from UE 104.

In step 218, communications controller 102 optionally transmits a PDCCH to UE 104. A DCI may be transmitted in the PDCCH. In one example, communications controller 102 switches from transmitting ePDCCH to transmitting PDCCH, and step 218 is performed. In another example, communications controller 102 continues to transmit ePDCCH, and step 218 is skipped.

Communications controller 102 transmits a random access response to UE 104 in step 220. In one example, the CRC of the DCI carrying the scheduling information for the random access response is scrambled using the RA-RNTI only on the subframes that UE 104 will monitor the PDCCH common search space. In another example, the CRC of the DCI carrying the scheduling information for the random access response is scrambled with the RA-RNTI on the ePDCCH UE specific search space. Communications controller 102 knows when UE 104 will monitor the ePDCCH common search space, because the ePDCCH configuration parameters, which are RRC parameters, specify which subframes can be used for ePDCCH.

Finally, in step 222, communications controller 102 receives a response message from UE 104 on the PUSCH. If communications controller 102 was previously transmitting messages on the PDCCH, it may resume transmission of the DCI on the ePDCCH.

Figure 11:
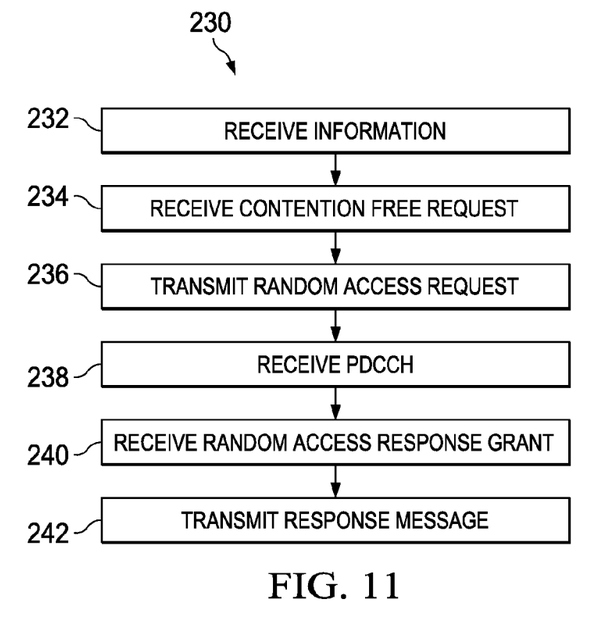
FIG. 11 illustrates an embodiment flowchart for a method of contention-free random access by a user equipment (UE)

FIG. 11 illustrates flowchart 230 for a method of contention-free random access performed by UE 104. Initially, in step 232, UE 104 receives a broadcast message from communications controller 102. For example, the broadcast message contains RACH parameters.

Next, in step 234, UE 104 receives a contention-free request from communications controller 102. In one example, the contention-free request is a PDCCH order transmitted in a DCI format 1A on the ePDCCH. The UE may locate the DCI among several channels (ePDCCH and PDCCH) and among search spaces (UE specific and common). UE 104 may monitor the ePDCCH common search space on only some subframes to get a system information block (SIB) messages and the paging messages. In one embodiment, UE 104 automatically switches to monitoring the PDCCH, and stops monitoring the ePDCCH after receiving the PDCCH order. Alternatively, UE 104 continues to monitor the ePDCCH. In another example, the contention-free request is an RRC message, received in a PDSCH whose scheduling information was contained in a DCI, such as format 1A, received in the ePDCCH.

Then, in step 236, UE 104 transmits a RACH waveform to communications controller 102.

In step 238, UE 104 may optionally receive a PDCCH from communications controller 102. The PDCCH contains a DCI, for example a format 1A DCI. When UE 104 switches over to monitoring the PDCCH, it performs step 238. However, when UE 104 continues to monitor the ePDCCH, it skips step 238.

UE 104 receives a random access response from communications controller 102 in step 240.

Finally, in step 242, UE 104 transmits a response message to communications controller 102 based upon the grant in the random access response. When UE 104 had stopped monitoring the ePDCCH, it may begin monitoring the ePDCCH again. The decision to monitor the ePDCCH may be, for example, based on RRC messaging or subframe configuration.

In one example, communications controller 102 switches from PDCCH transmission to ePDCCH transmission for only a pre-determined number of subframes. For example, during a handoff procedure, communications controller 102 may switch to PDCCH transmission only until handoff is completed, and then switch back to ePDCCH transmission.

In an embodiment, contention-free RACH signaling may be initiated using higher layer signaling. In this embodiment, when UE 104 monitors the ePDCCH, it will receive the DCI for the PDSCH carrying the RRC request to contention-free RACH on the ePDCCH. Upon decoding the RRC signaling, UE 104 is alerted to contention-free RACH, and may switch to PDCCH monitoring.

Figure 12:
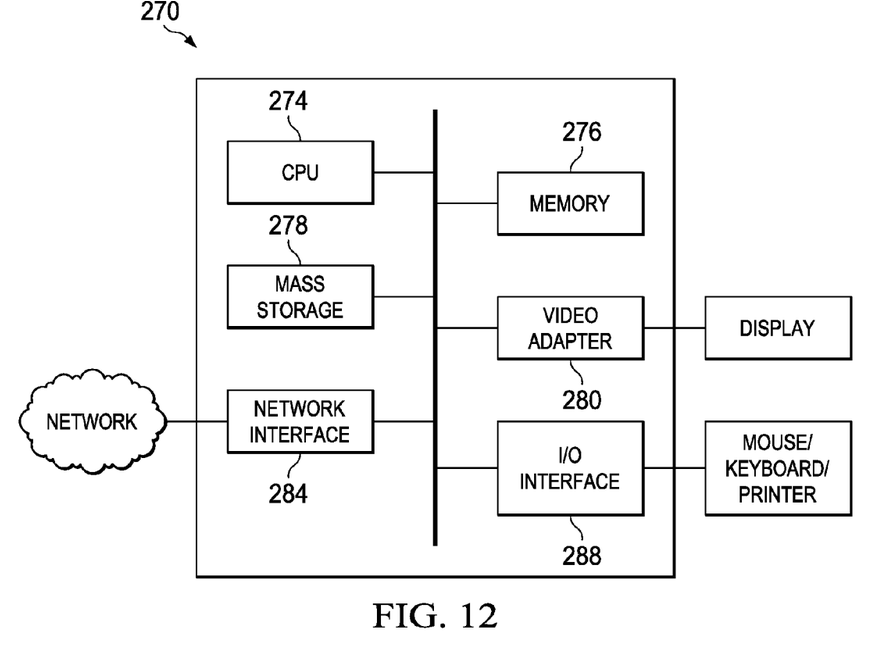
FIG. 12 illustrates a block diagram of an embodiment of a general-purpose computer system.

FIG. 12 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for initiating random access, the method comprising:
    receiving, by a user equipment (UE) from a communications controller, symbols of a first subframe comprising a first downlink control information (DCI), wherein the first DCI corresponds to a physical downlink control channel (PDCCH) order;
    searching for the first DCI in a first downlink control channel in common search space of the first subframe and a second downlink control channel in a UE specific search space of an enhanced physical downlink control channel (ePDCCH) in a data region of the first subframe;
    obtaining random access parameters from the first DCI, wherein the first DCI is in the data region of the first subframe;
    transmitting, by the UE to the communications controller, a random access preamble in accordance with the random access parameters; and
    receiving a second DCI in a control region of a second subframe, wherein the second DCI comprises scheduling information for a random access response.

2. The method of claim 1, wherein a cyclic redundancy check (CRC) associated with the first DCI is scrambled with a cell radio network temporary (C-RNTI).

3. The method of claim 1, wherein the first downlink control channel is an enhanced physical downlink control channel (ePDCCH).

4. The method of claim 1, wherein the random access parameters comprise a preamble index.

5. The method of claim 1, wherein the random access parameters comprise a physical random access channel (PRACH) mask index.

6. The method of claim 1, wherein receiving the second subframe is performed in accordance with the random access parameters.

7. The method of claim 1, wherein the common search space of the first subframe overlaps the UE specific search space of the ePDCCH.

8. A user equipment (UE) comprising:
    a processor; and
    a non-transitory computer readable storage medium storing programming for execution by the processor, the programming including instructions to:
        receive, from a communications controller, symbols of a first subframe comprising a first downlink control information (DCI), wherein the first DCI corresponds to a physical downlink control channel (PDCCH) order,
        search for the first DCI in a first downlink control channel in common search space of the first subframe and a second downlink control channel in a UE specific search space of an enhanced physical downlink control channel (ePDCCH) in a data region of the first subframe, obtain random access parameters from the first DCI, wherein the first DCI is in the data region of the first subframe, transmit, to the communications controller, a random access preamble in accordance with the random access parameters, and receive a second DCI in a control region of a second subframe, wherein the second DCI comprises scheduling information for a random access response.

9. A method for initiating random access, the method comprising:

generating a downlink control information (DCI) comprising random access parameters;

selecting a first control channel from a set including a physical downlink control channel (PDCCH) of a first subframe and an enhanced physical downlink control channel (ePDCCH) of the first subframe;

mapping the DCI to the first control channel; and transmitting, by a communications controller to a user equipment (UE), symbols of the first subframe comprising the DCI in the first control channel, wherein the DCI corresponds to a PDCCH order, and wherein the DCI is in a data region of the first subframe.

10. The method of claim 9, wherein the first control channel is in a control region of the first subframe.

11. The method of claim 9, wherein the first control channel is in a UE specific search space of the PDCCH of the first subframe.

12. The method of claim 9, wherein the first control channel is in a common search space of the PDCCH of the first subframe.

13. The method of claim 9, wherein the first control channel is in a UE specific search space of the ePDCCH of the first subframe.

14. The method of claim 9, wherein the first control channel is in a common search space of the ePDCCH of the first subframe.

15. The method of claim 9, further comprising:

receiving, by the communications controller from the UE, a random access preamble in accordance with the random access parameters; and transmitting, by the communications controller to the UE, after receiving the random access preamble, a second subframe comprising a second DCI in a second control channel of the second subframe, wherein the second DCI comprises scheduling information for a random access response.

16. The method of claim 9, wherein the first subframe does not contain a control region.

17. The method of claim 9, further comprising determining a length of the DCI in accordance with whether the first control channel is in the PDCCH of the first subframe or the ePDCCH of the first subframe.

18. The method of claim 9, wherein the random access parameters comprise a preamble index.

19. The method of claim 9, wherein common search space of the first subframe overlaps UE specific search space of the ePDCCH.

20. A communications controller comprising:

a processor; and a non-transitory computer readable storage medium storing programming for execution by the processor, the programming including instructions to:

generate a downlink control information (DCI) comprising random access parameters, select a control channel from a set including a physical downlink control channel (PDCCH) of a subframe and an enhanced physical downlink control channel (ePDCCH) of the subframe, map the DCI to the control channel, and transmit, to a user equipment (UE), symbols of the subframe comprising the DCI in the control channel, wherein the DCI corresponds to a PDCCH order, and wherein the DCI is in a data region of the subframe.

21. A method for initiating random access, the method comprising:

generating a downlink control information (DCI) comprising random access parameters;

selecting a first control channel from an enhanced physical downlink control channel (ePDCCH) of a subframe;

mapping the DCI to the first control channel; and transmitting, by a communications controller to a user equipment (UE), symbols of the subframe comprising the DCI in the first control channel, wherein the DCI corresponds to a PDCCH order, and wherein the DCI is in a data region of the subframe.

22. A communications controller comprising:

a processor; and a non-transitory computer readable storage medium storing programming for execution by the processor, the programming including instructions to:

generate a downlink control information (DCI) comprising random access parameters, select a control channel from an enhanced physical downlink control channel (ePDCCH) of a subframe, map the DCI to the control channel, and transmit, to a user equipment (UE), symbols of the subframe comprising the DCI in the control channel, wherein the DCI corresponds to a PDCCH order, and wherein the DCI is in a data region of the subframe.

* * * * *